(12) United States Patent
Onodera et al.

(10) Patent No.: US 10,971,306 B2
(45) Date of Patent: Apr. 6, 2021

(54) ELECTRONIC COMPONENT HAVING AN EXTERNAL ELECTRODE WITH A CONDUCTIVE RESIN LAYER

(71) Applicant: TDK CORPORATION, Tokyo (JP)

(72) Inventors: Shinya Onodera, Tokyo (JP); Takehisa Tamura, Tokyo (JP); Ken Morita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 98 days.

(21) Appl. No.: 16/250,505

(22) Filed: Jan. 17, 2019

(65) Prior Publication Data
US 2019/0237250 A1 Aug. 1, 2019

(30) Foreign Application Priority Data

Jan. 31, 2018 (JP) .............................. JP2018-015120

(51) Int. Cl.
*H01G 4/232* (2006.01)
*H01G 4/30* (2006.01)
*H01G 2/06* (2006.01)
*H01G 4/12* (2006.01)

(52) U.S. Cl.
CPC ........... *H01G 4/2325* (2013.01); *H01G 2/065* (2013.01); *H01G 4/30* (2013.01); *H01G 4/12* (2013.01)

(58) Field of Classification Search
CPC ........ H01G 4/2325; H01G 4/232; H01G 4/30; H01G 4/12; H01G 2/04; H01G 2/06; H01G 2/065
See application file for complete search history.

(56) References Cited

U.S. PATENT DOCUMENTS

| 6,381,117 | B1 * | 4/2002 | Nakagawa | H01G 2/14 361/301.4 |
|---|---|---|---|---|
| 10,347,426 | B2 * | 7/2019 | Egashira | H01G 4/248 |
| 2013/0242457 | A1 * | 9/2013 | Lee | H01G 4/2325 361/301.4 |
| 2013/0250472 | A1 * | 9/2013 | Lee | H01G 4/012 361/301.4 |
| 2014/0192453 | A1 * | 7/2014 | Hong | H01G 4/12 361/301.4 |

(Continued)

FOREIGN PATENT DOCUMENTS

| JP | H08-107038 A | 4/1996 |
|---|---|---|
| JP | 2008-181956 A | 8/2008 |

(Continued)

*Primary Examiner* — David M Sinclair
(74) *Attorney, Agent, or Firm* — Oliff PLC

(57) ABSTRACT

An element body of a rectangular parallelepiped shape includes a first principal surface arranged to constitute a mounting surface, a second principal surface opposing the first principal surface in a first direction, a pair of side surfaces opposing each other in a second direction, and a pair of end surfaces opposing each other in a third direction. An external electrode is disposed on the element body. The external electrode includes a conductive resin layer. The conductive resin layer continuously covers one part of the first principal surface, one part of the end surface, and one part of each of the pair of side surfaces. A length of the conductive resin layer in the third direction is smaller than a length of the conductive resin layer in the first direction.

8 Claims, 10 Drawing Sheets

(56) References Cited

U.S. PATENT DOCUMENTS

| | | | |
|---|---|---|---|
| 2014/0233147 A1* | 8/2014 | Hong | H01G 4/008 361/301.4 |
| 2015/0077898 A1* | 3/2015 | Chung | H01G 4/232 361/301.4 |
| 2016/0020028 A1* | 1/2016 | Katsuta | H01G 4/0085 361/301.4 |
| 2016/0099106 A1* | 4/2016 | Kurokawa | H01F 27/2804 361/301.4 |
| 2016/0351332 A1 | 12/2016 | Lee et al. | |
| 2017/0154729 A1 | 6/2017 | Lee et al. | |
| 2017/0186538 A1 | 6/2017 | Ando et al. | |
| 2018/0151296 A1* | 5/2018 | Yamada | H01G 2/06 |

FOREIGN PATENT DOCUMENTS

| | | | | |
|---|---|---|---|---|
| JP | 2010073780 A | * | 4/2010 | H01G 4/228 |
| JP | 4947076 B2 | | 6/2012 | |
| JP | 2017-120819 A | | 7/2017 | |
| KR | 10-2016-0139932 A | | 12/2016 | |

* cited by examiner

ELECTRONIC COMPONENT HAVING AN EXTERNAL ELECTRODE WITH A CONDUCTIVE RESIN LAYER

BACKGROUND OF THE INVENTION

1. Field of the Invention

The present invention relates to an electronic component.

2. Description of Related Art

Known electronic components include an element body of a rectangular parallelepiped shape and a plurality of external electrodes (see, for example, Japanese Unexamined Patent Publication No. H8-107038). The element body includes a first principal surface arranged to constitute a mounting surface, a second principal surface opposing the first principal surface in a first direction, a pair of side surfaces opposing each other in a second direction, and a pair of end surfaces opposing each other in a third direction. The plurality of external electrodes is disposed at both end portions of the element body in the third direction. The external electrode includes a conductive resin layer.

SUMMARY OF THE INVENTION

An object of one aspect of the present invention is to provide an electronic component that suppresses occurrence of a crack in an element body and further improves moisture resistance reliability.

An electronic component according to one aspect includes an element body of a rectangular parallelepiped shape and a plurality of external electrodes. The element body includes a first principal surface arranged to constitute a mounting surface, a second principal surface opposing the first principal surface in a first direction, a pair of side surfaces opposing each other in a second direction, and a pair of end surfaces opposing each other in a third direction. The plurality of external electrodes is disposed at both end portions of the element body in the third direction. The external electrode includes a conductive resin layer. The conductive resin layer continuously covers one part of the first principal surface, one part of the end surface, and one part of each of the pair of side surfaces. A first length of the conductive resin layer in the third direction is smaller than a second length of the conductive resin layer in the first direction.

In a case in which the electronic component is solder-mounted on an electronic device, external force applied onto the electronic component from the electronic device may act as stress on the element body. The electronic device includes, for example, a circuit board or an electronic component. The external force acts on the element body from a solder fillet formed at the solder-mounting, through the external electrode. In this case, a crack may occur in the element body. The external force tends to act on a region defined by one part of the first principal surface, one part of the end surface, and one part of the pair of side surfaces, in the element body.

In the one aspect, the conductive resin layer continuously covers the one part of the first principal surface, the one part of the end surface, and the one part of each of the pair of side surfaces. Therefore, the external force applied onto the electronic component from the electronic device tends not to act on the element body. Consequently, the one aspect suppresses occurrence of a crack in the element body.

A region between the element body and the conductive resin layer may include a path through which moisture infiltrates. In a case in which moisture infiltrates from the region between the element body and the conductive resin layer, durability of the electronic component decreases. The one aspect includes few paths through which moisture infiltrates, as compared with an electronic component in which the conductive resin layer covers the entire end surface, one part of each of the principal surfaces, and one part of each of the pair of side surfaces. Therefore, the one aspect improves moisture resistance reliability.

In the one aspect, the first length of the conductive resin layer in the third direction is smaller than the second length of the conductive resin layer in the first direction. Therefore, the one aspect includes further few paths through which moisture infiltrates, as compared with an electronic component in which the first length is equal to or larger than the second length. Therefore, the one aspect further improves the moisture resistance reliability.

In the one aspect, the external electrode may include a sintered metal layer disposed on the end portion of the element body to be positioned between the element body and the conductive resin layer. The conductive resin layer may be disposed on the sintered metal layer and on the one part of the first principal surface, and may include a portion positioned on the first principal surface. The portion positioned on the first principal surface may include a maximum thickness position. A third length from the maximum thickness position to an end edge of the conductive resin layer, in the third direction may be larger than a fourth length from the maximum thickness position to an end edge of the sintered metal layer, in the third direction. The stress acting on the element body tends to concentrate on the end edge of the sintered metal layer. In a configuration in which the third length is larger than the fourth length, volume of the portion positioned on the first principal surface is large, as compared with an electronic component in which the third length is equal to or smaller than the fourth length. Therefore, this configuration reduces the stress concentrating on the end edge of the sintered metal layer. Consequently, this configuration further suppresses the occurrence of a crack in the element body.

In the one aspect, a thickness of the portion positioned on the first principal surface may gradually decrease from the maximum thickness position to the end edge of the conductive resin layer.

In a case in which the external force acts on the end edge of the conductive resin layer, the conductive resin layer may peel off from the element body with the end edge as a starting point. In a configuration in which the thickness of the portion positioned on the first principal surface gradually decreases from the maximum thickness position to the end edge of the conductive resin layer, the external force tends not to act on the end edge of the conductive resin layer, as compared with an electronic component in which a thickness of the conductive resin layer is constant. Therefore, in this configuration, the conductive resin layer tends not to peel off from the element body.

In the one aspect, the second length of the conductive resin layer in the first direction may be larger than a fifth length from the end edge of the sintered metal layer to the end edge of the conductive resin layer, in the third direction. This configuration suppresses that external force applied onto a portion positioned on the end surface in the external electrode acts as stress on the element body, as compared with an electronic component in which the second length is equal to or smaller than the fifth length. Therefore, this configuration further suppresses the occurrence of a crack in the element body.

In the one aspect, the conductive resin layer may include a portion positioned on the first principal surface and a portion positioned on the end surface. An area of the portion positioned on the end principal surface may be larger than an area of the portion positioned on the first principal surface. This configuration suppresses that external force applied onto a portion positioned on the end surface in the external electrode acts as stress on the element body, as compared with an electronic component in which the area of the portion positioned on the end surface is equal to or smaller than the area of the portion positioned on the first principal surface. Therefore, this configuration further suppresses the occurrence of a crack in the element body.

In the one aspect, the conductive resin layer may include a portion positioned on the first principal surface and a portion positioned on the end surface. A maximum thickness of the portion positioned on the first principal surface may be larger than a maximum thickness of the portion positioned on the end surface. This configuration reduces the stress concentrating on the end edge of the sintered metal layer, as compared with an electronic component in which the maximum thickness of the portion positioned on the first principal surface is equal to or smaller than the maximum thickness of the portion positioned on the end surface. Therefore, this configuration further suppresses the occurrence of a crack in the element body.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
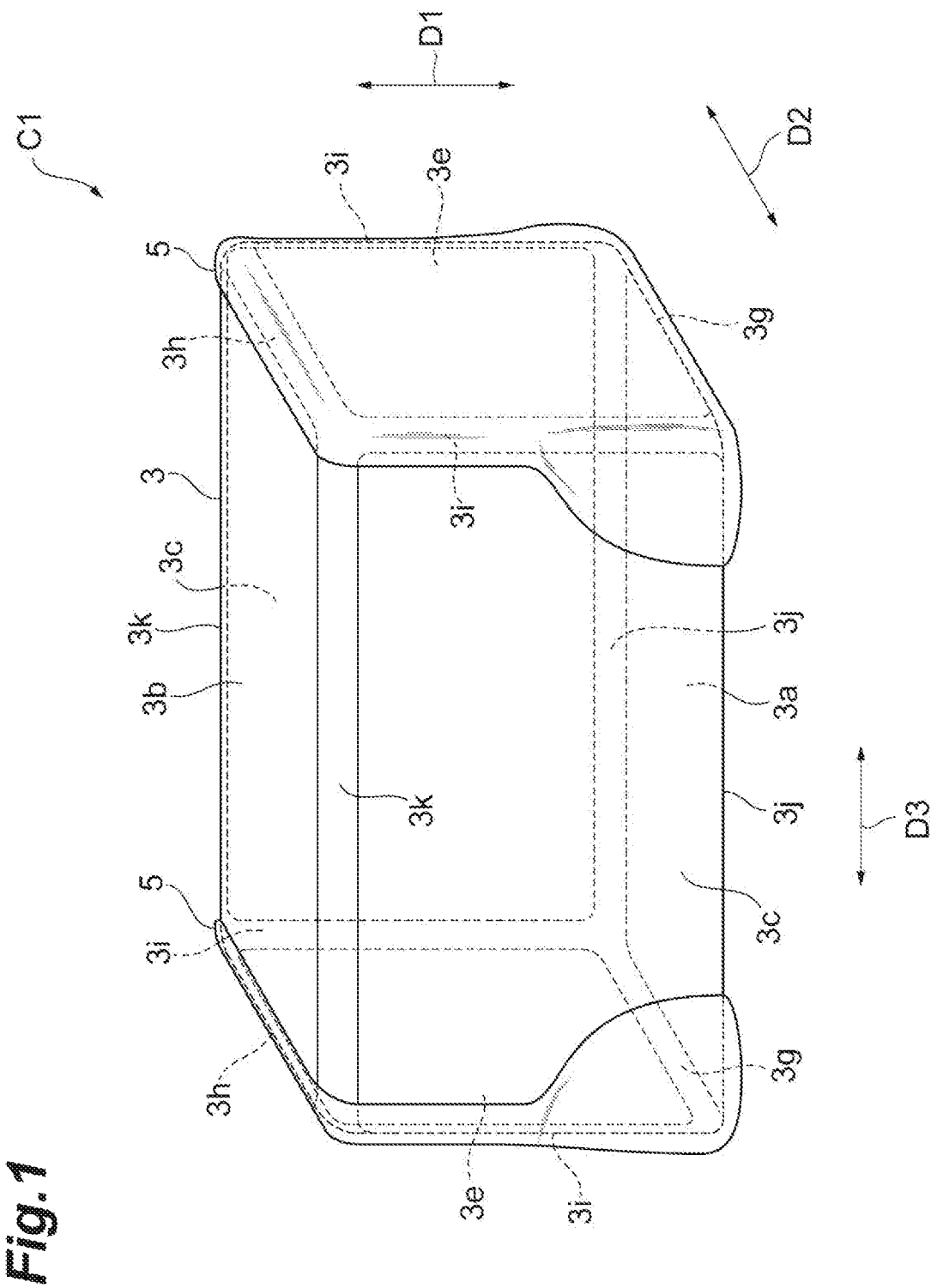
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
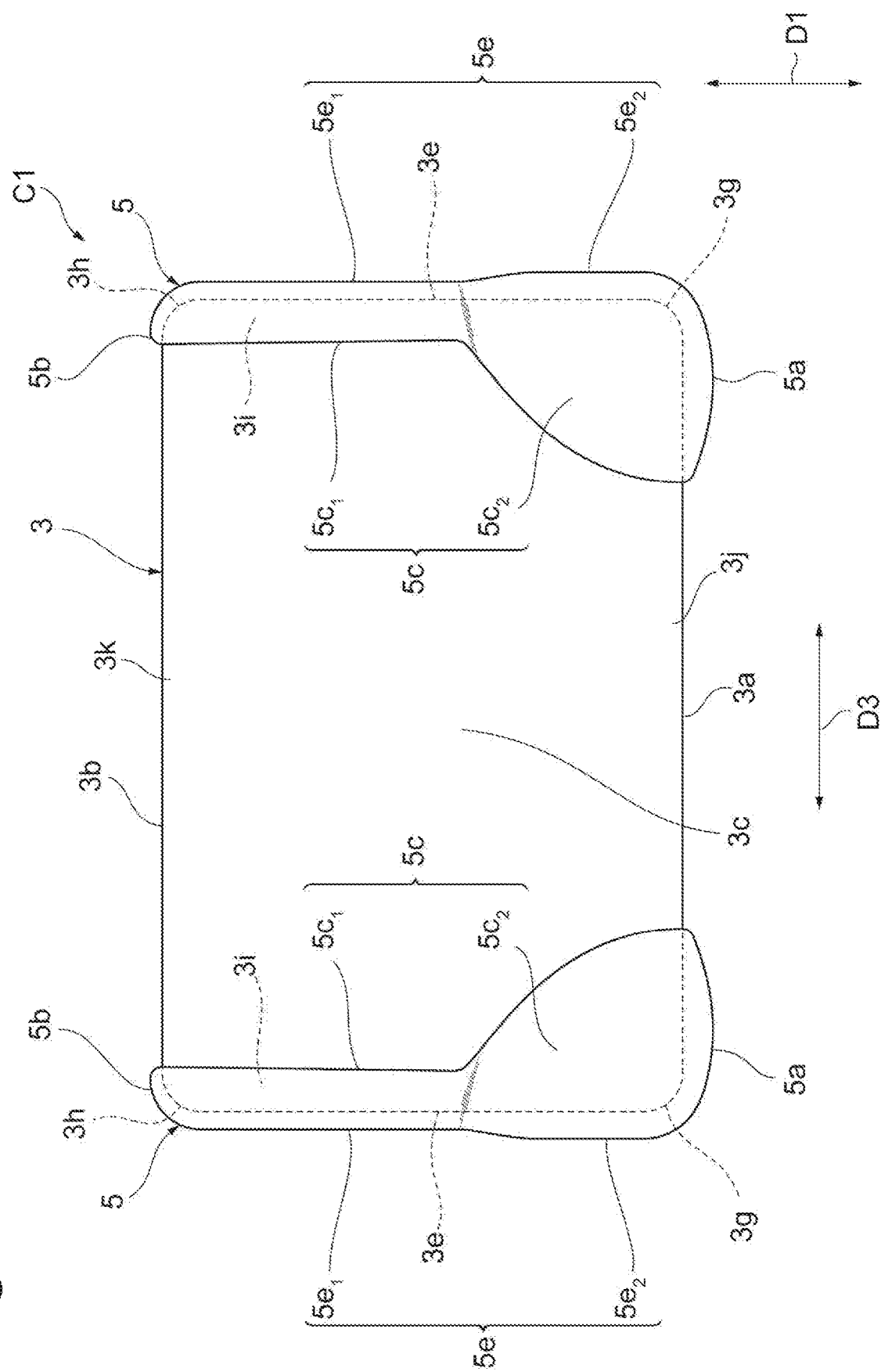
FIG. 2 is a side view of the multilayer capacitor according to the embodiment.
Figure 3:
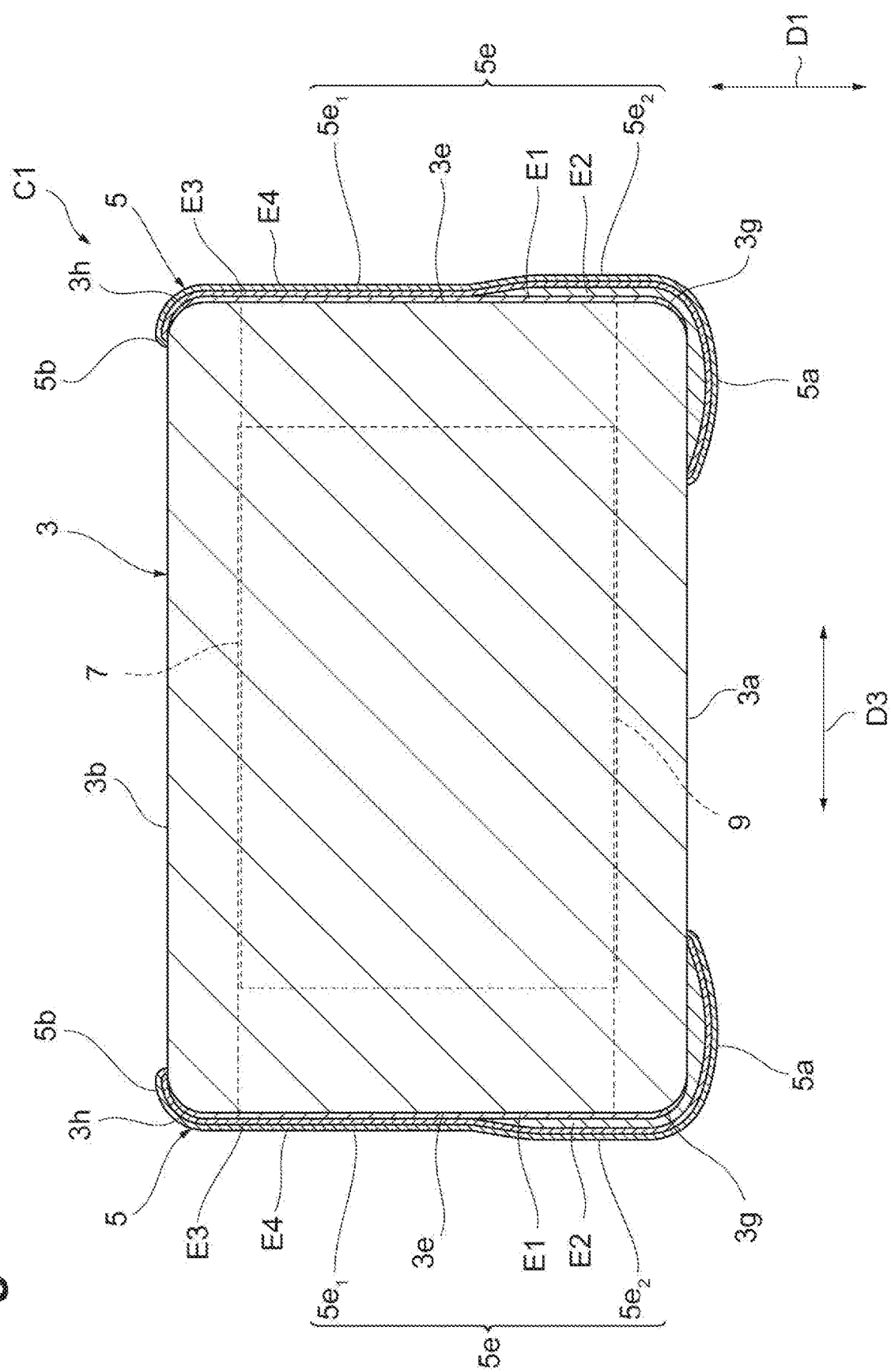
FIG. 3 is a view illustrating a cross-sectional configuration of the multilayer capacitor according to the embodiment.
Figure 4:
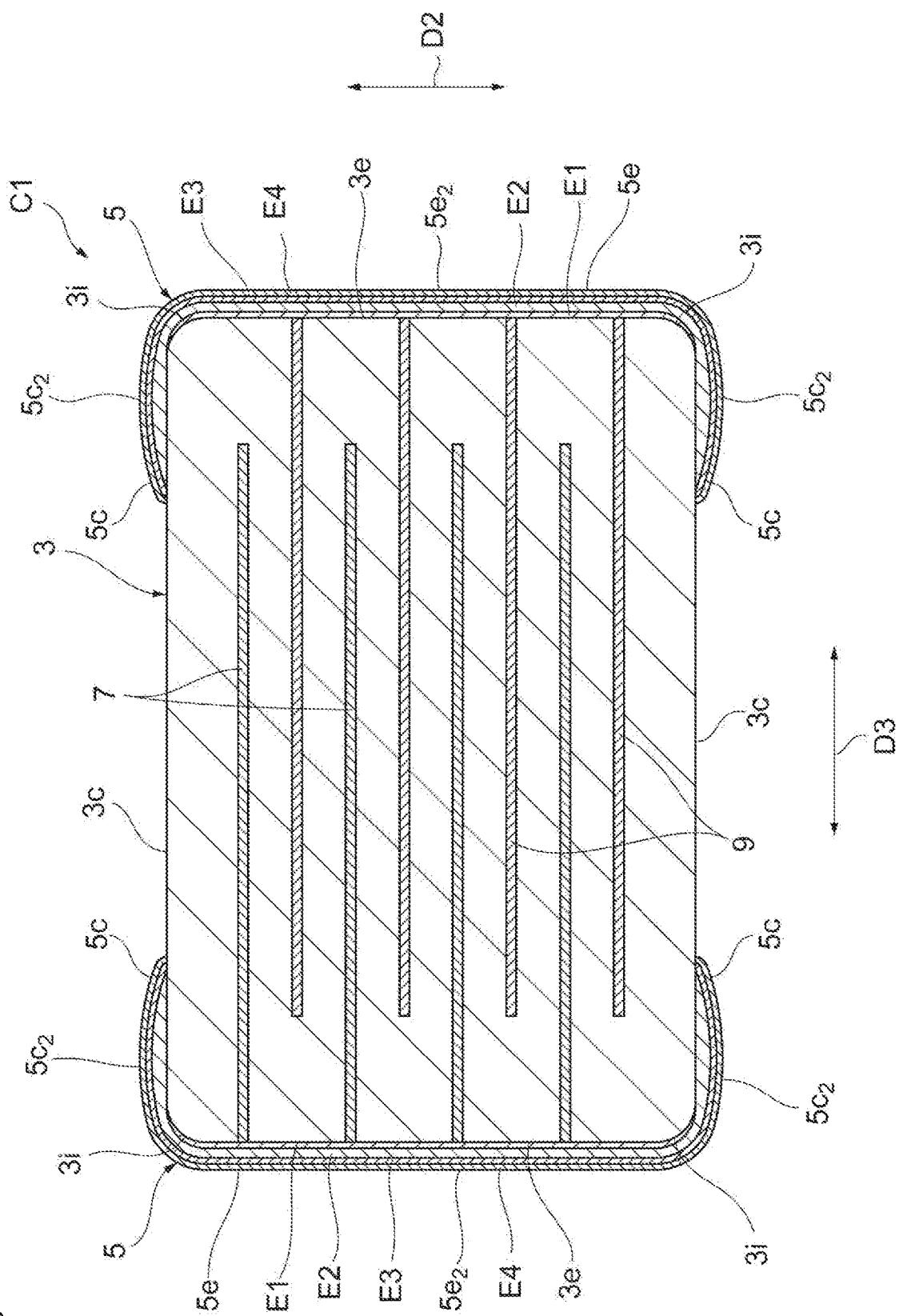
FIG. 4 is a view illustrating the cross-sectional configuration of the multilayer capacitor according to the embodiment.
Figure 5:
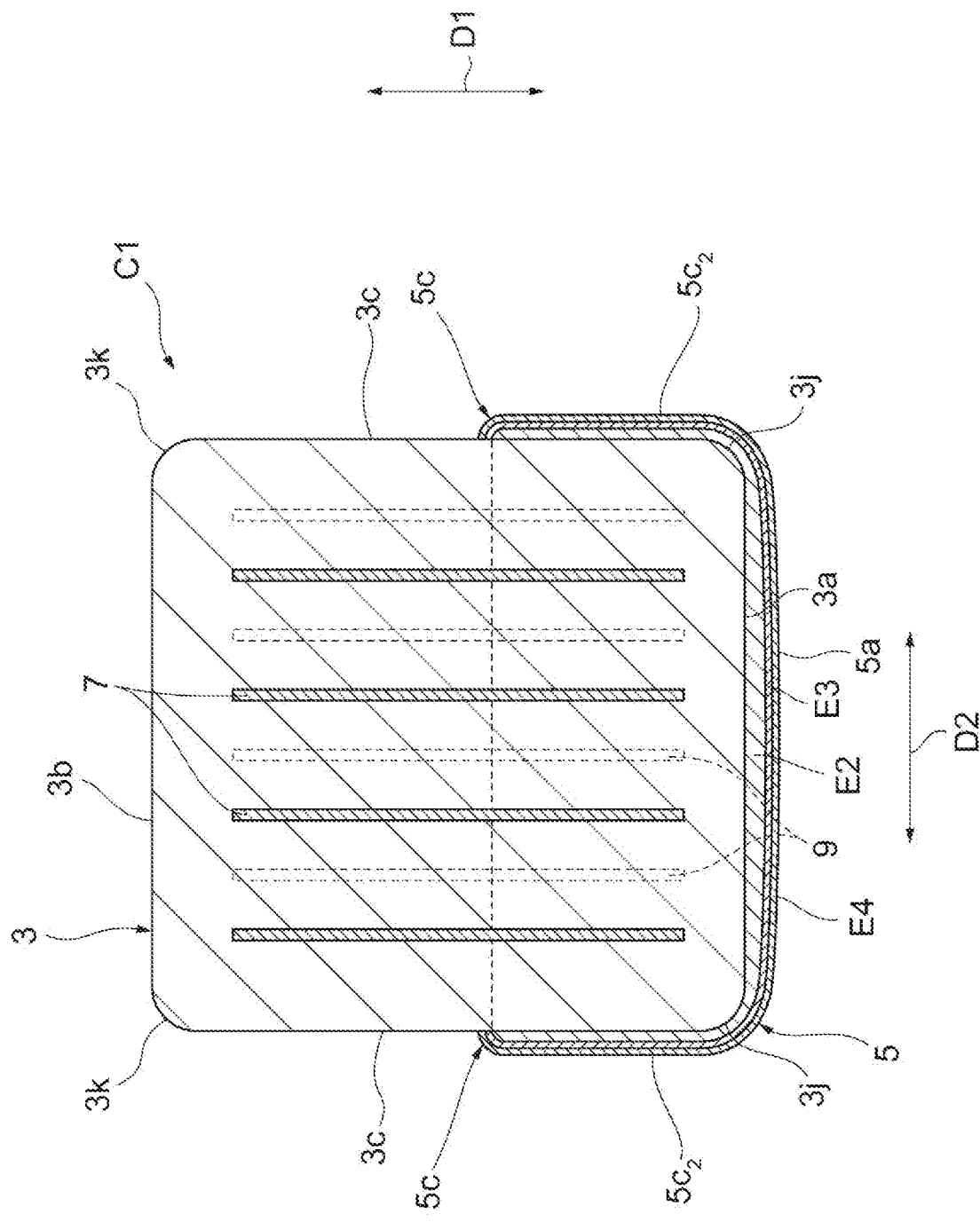
FIG. 5 is a view illustrating the cross-sectional configuration of the multilayer capacitor according to the embodiment.
Figure 6:
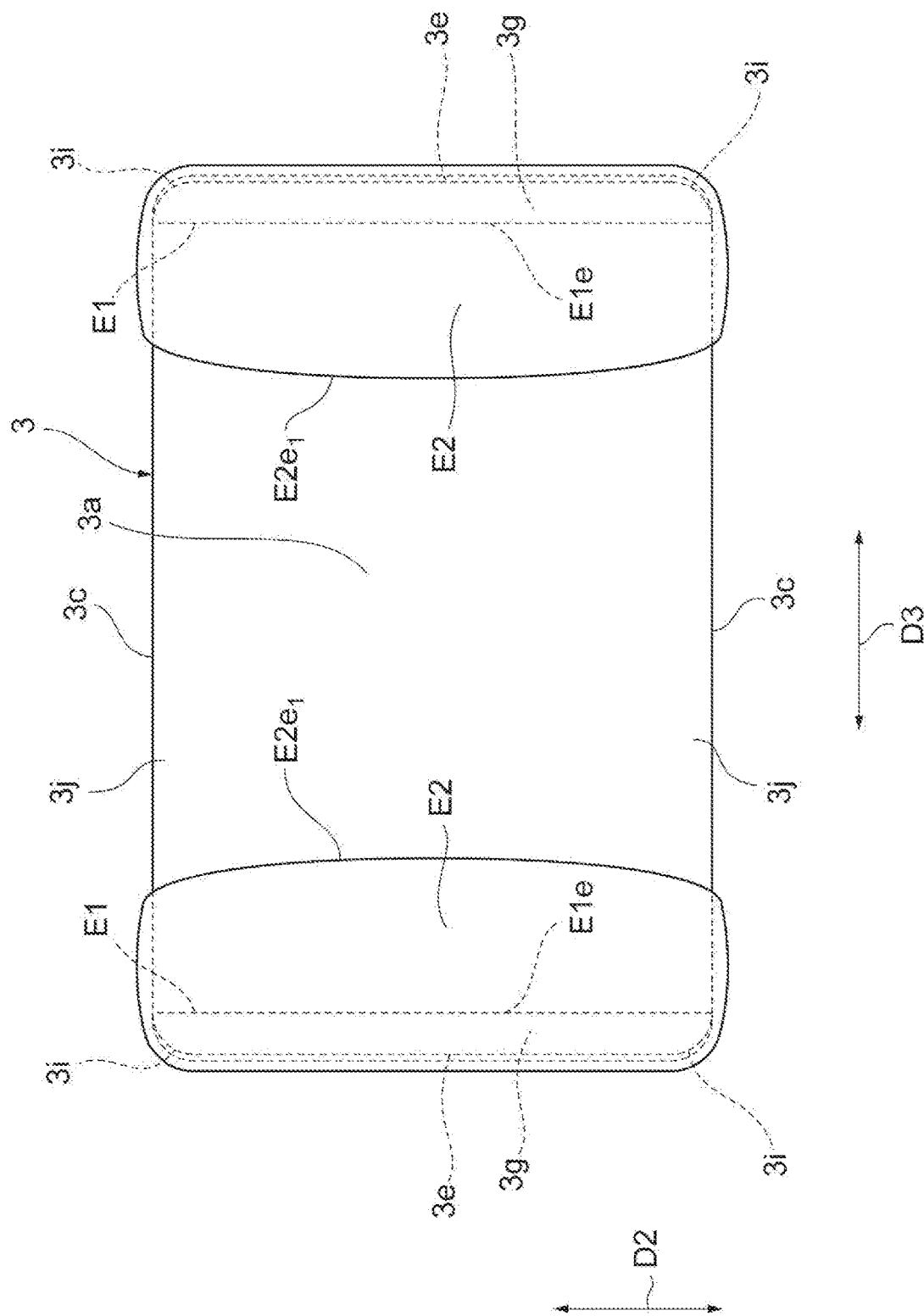
FIG. 6 is a plan view illustrating an element body, a first electrode layer, and a second electrode layer.
Figure 7:
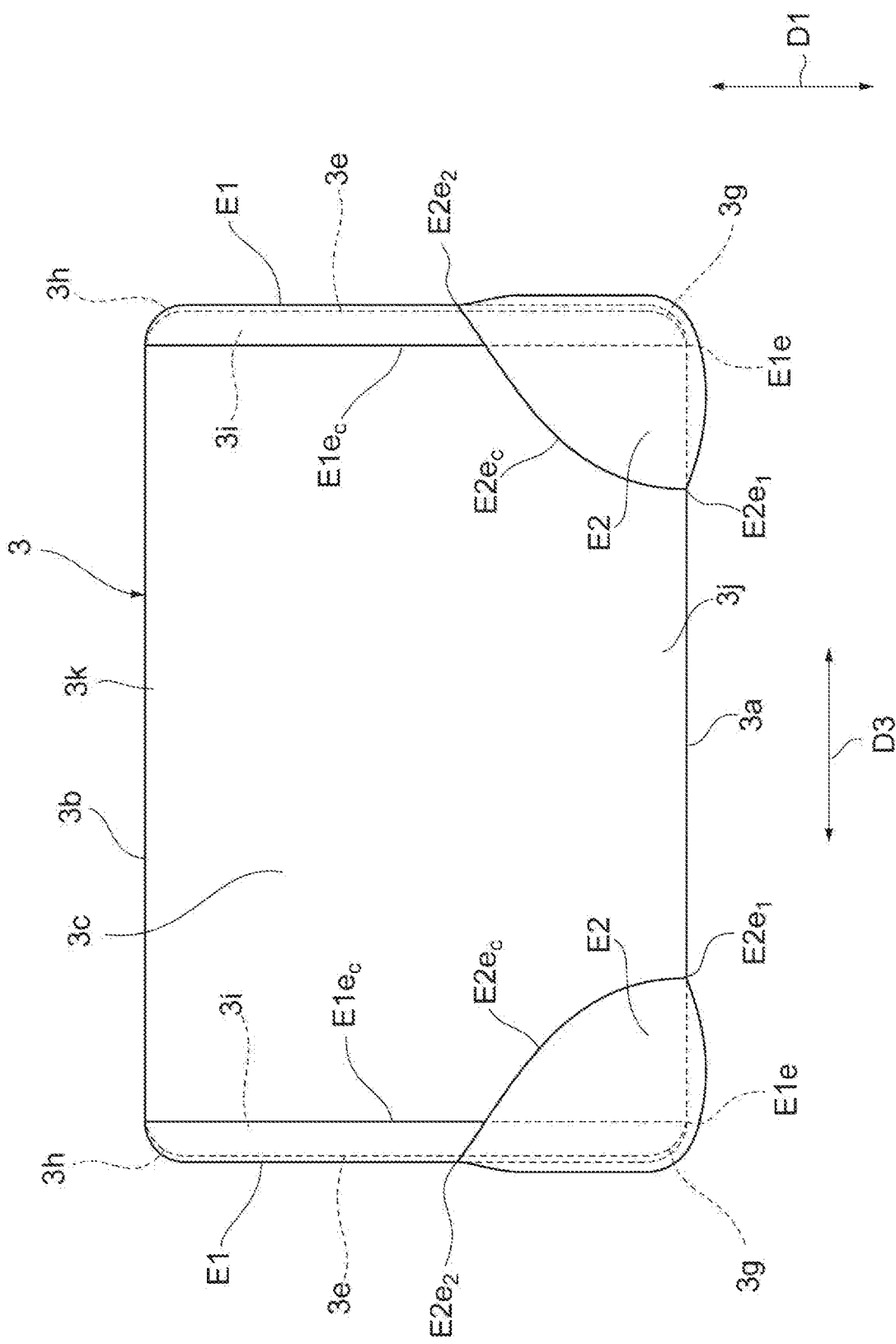
FIG. 7 is a side view illustrating the element body, the first electrode layer, and the second electrode layer.
Figure 8:
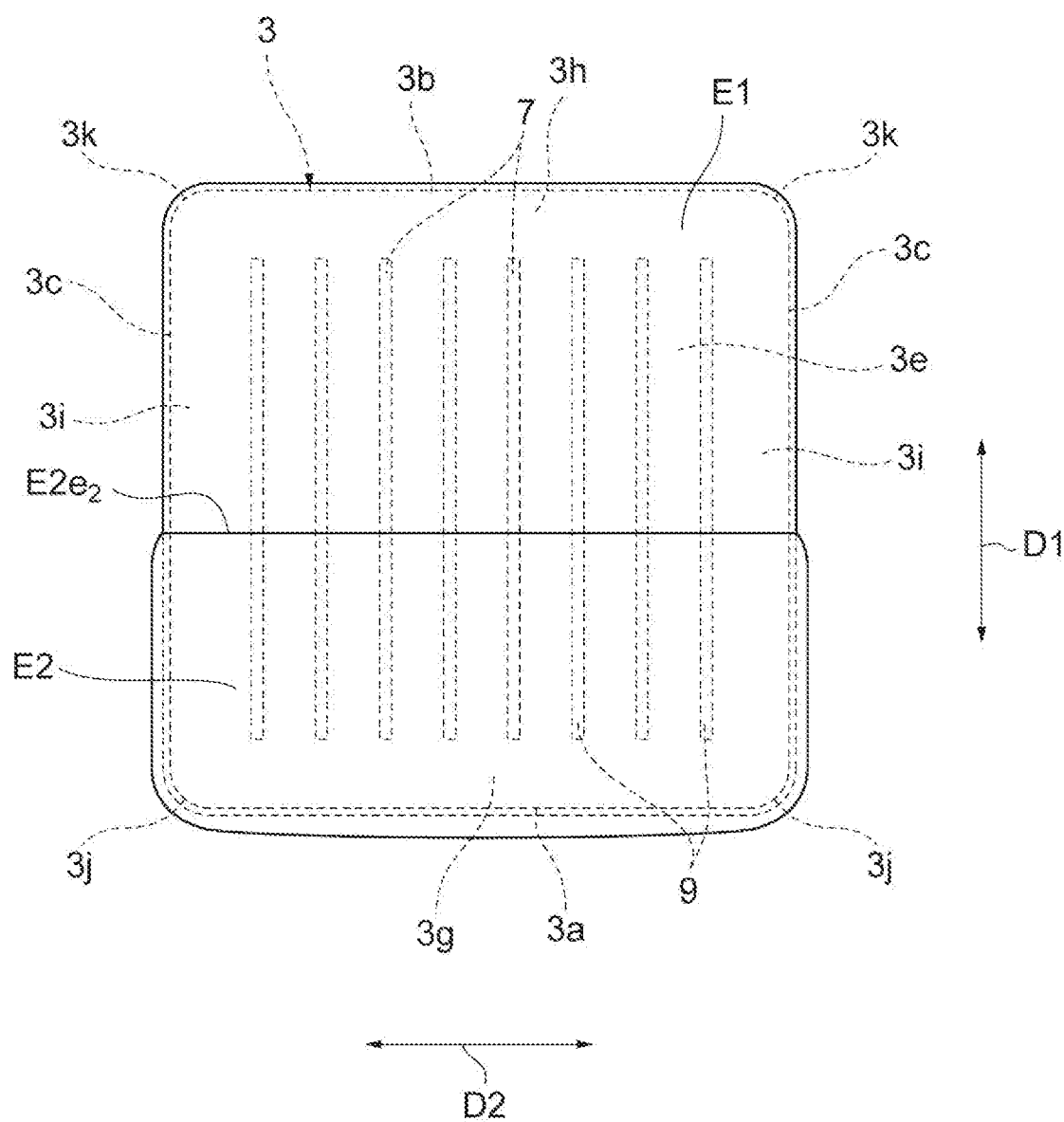
FIG. 8 is an end view illustrating the element body, the first electrode layer, and the second electrode layer.
Figure 9:
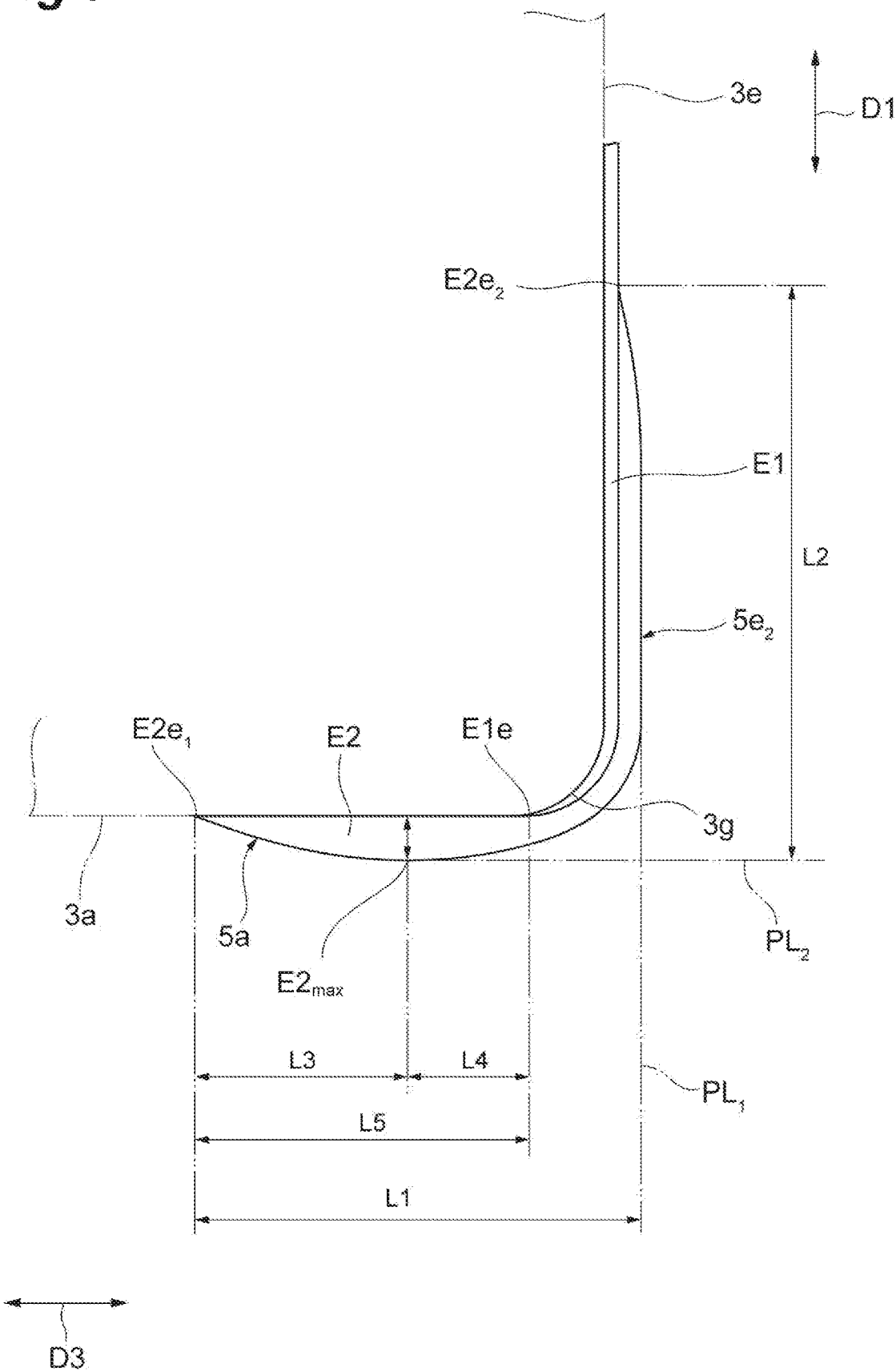
FIG. 9 is a view illustrating a cross-sectional configuration of the first electrode layer and the second electrode layer.

A configuration of a multilayer capacitor C1 according to an embodiment will be described with reference to FIGS. 1 to 9. FIG. 1 is a perspective view of the multilayer capacitor according to the embodiment. FIG. 2 is a side view of the multilayer capacitor according to the embodiment. FIGS. 3 to 5 are views illustrating a cross-sectional configuration of the multilayer capacitor according to the embodiment. FIG. 6 is a plan view illustrating an element body, a first electrode layer, and a second electrode layer. FIG. 7 is a side view illustrating the element body, the first electrode layer, and the second electrode layer. FIG. 8 is an end view illustrating the element body, the first electrode layer, and the second electrode layer. FIG. 9 is a view illustrating a cross-sectional configuration of the first electrode layer and the second electrode layer. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b and the pair of side surfaces 3c have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device. The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface.

The first direction D1 is a direction orthogonal to the respective principal surfaces 3a and 3b and is orthogonal to the second direction D2. The third direction D3 is a direction parallel to the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3.

The pair of side surfaces 3c extends in the first direction D1 to couple the pair of principal surfaces 3a and 3b. The pair of side surfaces 3c also extends in the third direction D3. The pair of end surfaces 3e extends in the first direction D1 to couple the pair of principal surfaces 3a and 3b. The pair of end surfaces 3e extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is positioned between the end surface 3e and the principal surface 3a. The ridge portion 3h is positioned between the end surface 3e and the principal surface 3b. The ridge portion 3i is positioned between the end surface 3e and the side surface 3c. The ridge portion 3j is positioned between the principal surface 3a and the side surface 3c. The ridge portion 3k is positioned between the principal surface 3b and the side surface 3c. In the present embodiment, each of the ridge portions 3g, 3h, 3i, 3j, and 3k is rounded to curve. The element body 3 is subject to what is called a round chamfering process. Each of the ridge portions 3g, 3h, 3i, 3j, and 3k includes a curved surface having a predetermined radius of curvature. In the present embodiment, the radii of curvature of the ridge portions 3g, 3h, 3i, 3j, and 3k (curved surfaces) are approximately equivalent to each other. The radii of curvature of the ridge portions 3g, 3h, 3i, 3j, and 3k (curved surfaces) may be different from each other.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the second direction D2. The element body 3 includes the plurality of laminated dielectric layers. In the element body 3, a lamination direction of the plurality of dielectric layers coincides with the second direction D2. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the first direction D1.

As illustrated in FIGS. 3 to 5, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. Polarities of the internal electrodes 7 and the internal electrodes 9 are different from each other. In a case in which the lamination direction of the plurality of dielectric layers is the first direction D1, the internal electrodes 7 and the internal electrodes 9 are disposed in different positions (layers) in the first direction D1. Each of the internal electrodes 7 and 9 includes one end exposed to a corresponding end surface 3e of the pair of end surfaces 3e. The plurality of internal electrodes 7 and the plurality of internal electrodes 9 are alternately disposed in the second direction D2. The internal electrodes 7 and 9 are positioned in a plane approximately orthogonal to the principal surfaces 3a and 3b. The internal electrodes 7 and the internal electrodes 9 oppose each other in the second direction D2. The direction (second direction D2) in which the internal electrodes 7 and the internal electrodes 9 oppose each other is orthogonal to the direction (first direction D1) orthogonal to the principal surfaces 3a and 3b.

As illustrated in FIG. 2, the external electrodes 5 are disposed at both end portions of the element body 3 in the third direction D3. Each of the external electrodes 5 is disposed on the corresponding end surface 3e side of the element body 3. As illustrated in FIGS. 3 to 5, the external electrode 5 includes a plurality of electrode portions 5a, 5b, 5c, and 5e. The electrode portion 5a is disposed on the principal surface 3a and the ridge portion 3g. The electrode portion 5b is disposed on the ridge portion 3h. The electrode portion 5c is disposed on each side surface 3c and each ridge portion 3i. The electrode portion 5e is disposed on the corresponding end surface 3e. The external electrode 5 also includes electrode portions disposed on the ridge portion 3j.

The external electrode 5 is formed on the four surfaces, that is, the principal surface 3a, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. In the present embodiment, the external electrode 5 is not intentionally formed on the principal surface 3b. Each electrode portion 5e covers all one ends of the corresponding internal electrodes 7 or 9. The electrode portion 5e is directly connected to the corresponding internal electrodes 7 or 9. The external electrode 5 is electrically connected to the corresponding internal electrodes 7 or 9.

As illustrated in FIGS. 3 to 5, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4. The electrode portion 5b includes the first electrode layer E1, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is in contact with the entire ridge portion 3g. The principal surface 3a is not covered with the first electrode layer E1, and is exposed from the first electrode layer E1. The second electrode layer E2 included in the electrode portion 5a is disposed on the first electrode layer E1 and on the principal surface 3a. The first electrode layer E1 included in the electrode portion 5a is entirely covered with the second electrode layer E2. The second electrode layer E2 included in the electrode portion 5a is in contact with one part of the principal surface 3a and the entire first electrode layer E1. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a.

In a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

The second electrode layer E2 included in the electrode portion 5a is formed to cover the entire ridge portion 3g and the one part of the principal surface 3a. The one part of the principal surface 3a is, for example, the partial region near the end surface 3e, in the principal surface 3a. That is, the one part of the principal surface 3a is close to the end surface 3e. The second electrode layer E2 included in the electrode portion 5a is formed on the first electrode layer E1 and element body 3 in such a manner that the first electrode layer E1 is positioned between the second electrode layer E2 and the ridge portion 3g. The second electrode layer E2 included in the electrode portion 5a indirectly covers the entire ridge portion 3g. The second electrode layer E2 included in the electrode portion 5a directly covers an entire portion of the first electrode layer E1 formed on the ridge portion 3g. The second electrode layer E2 included in the electrode portion 5a directly covers the one part of the principal surface 3a.

The first electrode layer E1 included in the electrode portion 5b is disposed on the ridge portion 3h, and is not disposed on the principal surface 3b. The first electrode layer E1 included in the electrode portion 5b is in contact with the entire ridge portion 3h. The principal surface 3b is not covered with the first electrode layer E1, and is exposed from the first electrode layer E1. The electrode portion 5b does not include the second electrode layer E2. The principal surface 3b is not covered with the second electrode layer E2, and is exposed from the second electrode layer E2. The second electrode layer E2 is not formed on the principal surface 3b. The electrode portion 5b is three-layered.

The first electrode layer E1 included in the electrode portion 5c is disposed on the ridge portion 3i, and is not disposed on the side surface 3c. The first electrode layer E1 included in the electrode portion 5c is in contact with the entire ridge portion 3i. The side surface 3c is not covered with the first electrode layer E1, and is exposed from the first electrode layer E1. The second electrode layer E2 included in the electrode portion 5c is disposed on the first electrode layer E1 and on the side surface 3c. The second electrode layer E2 included in the electrode portion 5c covers one part of the first electrode layer E1. The second electrode layer E2 included in the electrode portion 5c is in contact with one part of the side surface 3c and the one part of the first electrode layer E1. The second electrode layer E2 included in the electrode portion 5c includes a portion positioned on the side surface 3c.

In a case in which an element is described as being positioned on another element, the element may be directly positioned on the other element or be indirectly positioned on the other element. In a case in which an element is indirectly positioned on another element, an intervening element is present between the element and the other element. In a case in which an element is directly positioned on another element, no intervening element is present between the element and the other element.

The second electrode layer E2 included in the electrode portion 5c is formed to cover one part of the ridge portion 3i and one part of the side surface 3c. The one part of the ridge portion 3i is, for example, a partial region near the principal surface 3a, in the ridge portion 3i. That is, the one part of the ridge portion 3i is close to the principal surface 3a. The one part of the side surface 3c is, for example, a corner region near the principal surface 3a and end surface 3e, in the side surface 3c. That is, the one part of the side surface 3c is close to the principal surface 3a and end surface 3e. The second electrode layer E2 included in the electrode portion 5c is formed on the first electrode layer E1 and element body 3 in such a manner that the first electrode layer E1 is positioned between the second electrode layer E2 and the one part of the ridge portion 3i. The second electrode layer E2 included in the electrode portion 5c indirectly covers the one part of the ridge portion 3i. The second electrode layer E2 included in the electrode portion 5c directly covers one part of the portion of the first electrode layer E1 formed on the ridge portion 3i. The second electrode layer E2 included in the electrode portion 5c directly covers the one part of the side surface 3c.

The electrode portion 5c includes a plurality of regions $5c_1$ and $5c_2$. In the present embodiment, the electrode portion 5c includes only two regions $5c_1$ and $5c_2$. The region $5c_2$ is positioned closer to the principal surface 3a than the region $5c_1$. The region $5c_1$ includes the first electrode layer E1, the third electrode layer E3, and the fourth electrode layer E4. The region $5c_1$ does not include the second electrode layer E2. The region $5c_1$ is three-layered. The region $5c_2$ includes the first electrode layer E1, the second electrode layer E2, the third electrode layer E3, and the fourth electrode layer E4. The regions $5c_2$ is four-layered on the ridge portion 3i, and is three-layered on the side surface 3c. The region $5c_1$ is the region where the first electrode layer E1 is exposed from the second electrode layer E2. The region $5c_2$ is the region where the first electrode layer E1 is covered with the second electrode layer E2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the first electrode layer E1 is partially covered with the second electrode layer E2. In the electrode portion 5e, the second electrode layer E2 is in contact with one part of the first electrode layer E1. The second electrode layer E2 included in the electrode portion 5e is formed to cover one part of the end surface 3e. The one part of the end surface 3e is, for example, a partial region near the principal surface 3a, in the end surface 3e. That is, the one part of the end surface 3e is close to the principal surface 3a. The second electrode layer E2 included in the electrode portion 5e is formed on the first electrode layer E1 in such a manner that the first electrode layer E1 is positioned between the second electrode layer E2 and the one part of the end surface 3e. The second electrode layer E2 included in the electrode portion 5e indirectly covers the one part of the end surface 3e. The second electrode layer E2 included in the electrode portion 5e directly covers one part of the first electrode layer E1 formed on the end surface 3e. The first electrode layer E1 included in the electrode portion 5e is formed on the end surface 3e to be coupled to the one ends of the corresponding internal electrodes 7 or 9.

The electrode portion 5e includes a plurality of regions $5e_1$ and $5e_2$. In the present embodiment, the electrode portion 5e includes only two regions $5e_1$ and $5e_2$. The region $5e_2$ is positioned closer to the principal surface 3a than the region $5e_1$. The region $5e_1$ includes the first electrode layer E1, the third electrode layer E3, and the fourth electrode layer E4. The region $5e_1$ does not include the second electrode layer E2. The region $5e_1$ is three-layered. The region $5e_2$ includes the first electrode layer E1, the second electrode layer $E2_1$, the third electrode layer E3, and the fourth electrode layer E4. The regions $5e_2$ is four-layered. The region $5e_1$ is the region where the first electrode layer E1 is exposed from the second electrode layer E2. The region $5e_2$ is the region where the first electrode layer E1 is covered with the second electrode layer E2.

The first electrode layer E1 is formed by sintering conductive paste applied onto the surface of the element body 3. The first electrode layer E1 is formed to cover the end surface 3e and the ridge portions 3g, 3h, and 3i. The first electrode layer E1 is formed by sintering a metal component (metal powder) contained in the conductive paste. The first electrode layer E1 includes a sintered metal layer. The first electrode layer E1 includes a sintered metal layer formed on the element body 3. The first electrode layer E1 is not intentionally formed on the pair of principal surfaces 3a and 3b and the pair of side surfaces 3c. The first electrode layer E1 may be unintentionally formed on the principal surfaces 3a and 3b and the side surfaces 3c due to a production error, for example. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing conductive resin paste applied onto the first electrode layer E1, the principal surface 3a, and the pair of side surfaces 3c. The second electrode layer E2 includes a conductive resin layer. The second electrode layer E2 is formed over the first electrode layer E1 and the element body 3. In the present embodiment, the second electrode layer E2 covers a partial region of the first electrode layer E1. The partial region of the first electrode layer E1 is, for example, the regions corresponding to the electrode portion 5a, the region $5c_2$ of the electrode portion 5c, and the region $5e_2$ of the electrode portion 5e, in the first electrode layer E1. The second electrode layer E2 directly covers a partial region of the ridge portion 3j. The partial region of the ridge portion 3j is, for example, the partial region near the end surface 3e, in the ridge portion 3j. That is, the partial region of the ridge portion 3j is close to the end surface 3e. The second electrode layer E2 is in contact with the partial region of the ridge portion 3j. The first electrode layer E1 serves as an underlying metal layer for forming the second electrode layer E2. The second electrode layer E2 is a conductive resin layer formed on the first electrode layer E1.

The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin.

The third electrode layer E3 is formed on the second electrode layer E2 and the first electrode layer E1 by plating method. The third electrode layer E3 includes a plating layer. The third electrode layer E3 is formed on a portion of the first electrode layer E1 exposed from the second electrode layer E2. In the present embodiment, the third electrode layer E3 is formed on the first electrode layer E1 and the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au.

The fourth electrode layer E4 is formed on the third electrode layer E3 by plating method. The fourth electrode layer E4 includes a plating layer. In the present embodiment, the fourth electrode layer E4 is formed on the third electrode layer E3 by Sn plating. The fourth electrode layer E4 is an Sn plating layer. The fourth electrode layer E4 may be a Cu plating layer or an Au plating layer. The fourth electrode layer E4 contains Sn, Cu, or Au. The third electrode layer E3 and the fourth electrode layer E4 constitute a plating layer formed on the second electrode layer E2. In the present embodiment, the plating layer formed on the second electrode layer E2 is two-layered.

The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed. The second electrode layer E2 included in the electrode portion 5a, the second electrode layer E2 included in the electrode portion 5c, and the second electrode layer E2 included in the electrode portion 5e are integrally formed. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

The first electrode layer E1 (first electrode layer E1 included in the electrode portion 5e) is formed on the end surface 3e to be connected to the corresponding internal electrodes 7 and 9. The first electrode layer E1 covers the entire end surface 3e, the entire ridge portion 3g, the entire ridge portion 3h, and the entire ridge portion 3i. The second electrode layer E2 (second electrode layers E2 included in the electrode portions 5a, 5c, and 5e) continuously covers one part of the principal surface 3a, one part of the end surface 3e, and one part of each of the pair of side surfaces 3c. The second electrode layer E2 (second electrode layers E2 included in the electrode portions 5a, 5c, and 5e) covers the entire ridge portion 3g, one part of the ridge portion 3i, and one part of the ridge portion 3j. The second electrode layer E2 includes a plurality of portions each corresponding to the one part of the principal surface 3a, the one part of the end surface 3e, the one part of each of the pair of side surfaces 3c, the entire ridge portion 3g, the one part of the ridge portion 3i, and the one part of the ridge portion 3j. The first electrode layer E1 (first electrode layer E1 included in the electrode portion 5e) is directly connected to the corresponding internal electrodes 7 and 9.

The first electrode layer E1 (first electrode layers E1 included in the electrode portions 5a, 5b, 5c, and 5e) includes a region covered with the second electrode layer E2 (second electrode layers E2 included in the electrode portions 5a, 5c, and 5e), and a region not covered with the second electrode layer E2 (second electrode layers E2 included in the electrode portions 5a, 5c, and 5e). The region not covered with the second electrode layer E2 is a region exposed from the second electrode layer E2. The third electrode layer E3 and the fourth electrode layer E4 cover the region not covered with the second electrode layer E2 in the first electrode layer E1, and the second electrode layer E2.

As illustrated in FIG. 6, when viewed from the first direction D1, the first electrode layer E1 (first electrode layer E1 included in the electrode portion 5a) is entirely covered with the second electrode layer E2. When viewed from the first direction D1, the first electrode layer E1 (first electrode layer E1 included in the electrode portion 5a) is not exposed from the second electrode layer E2.

As illustrated in FIG. 7, when viewed from the second direction D2, a first end region near the principal surface 3a of the first electrode layer E1 is covered with the second electrode layer E2. The first end region of the first electrode layer E1 includes the first electrode layer E1 included in the region $5c_2$. The first end region of the first electrode layer E1 is close to the principal surface 3a. When viewed from the second direction D2, an end edge $E2e_c$ of the second electrode layer E2 crosses an end edge $E1e_c$ of the first electrode layer E1. When viewed from the second direction D2, a second end region near the principal surface 3b of the first electrode layer E1 is exposed from the second electrode layer E2. The second end region of the first electrode layer E1 includes the first electrode layer E1 included in the region $5c_1$. The second end region of the first electrode layer E1 is close to the principal surface 3b. The second electrode layer E2 positioned on the side surface 3c opposes the internal electrode 7 or 9 having polarity different from that of the second electrode layer E2, in the second direction D2.

As illustrated in FIG. 8, when viewed from the third direction D3, a third end region near the principal surface 3a of the first electrode layer E1 is covered with the second electrode layer E2. The third end region of the first electrode layer E1 includes the first electrode layer E1 included in the region $5e_2$. The third end region of the first electrode layer E1 is close to the principal surface 3a. When viewed from the third direction D3, the end edge $E2e_2$ of the second electrode layer E2 is positioned on the first electrode layer E1. When viewed from the third direction D3, a fourth end region near the principal surface 3b of the first electrode layer E1 is exposed from the second electrode layer E2. The fourth end region of the first electrode layer E1 includes the first electrode layer E1 included in the region $5e_1$. The fourth end region of the first electrode layer E1 is close to the principal surface 3b. When viewed from the third direction D3, an area of the second electrode layer E2 positioned on the end surface 3e and ridge portion 3g is smaller than an area of the first electrode layer E1 positioned on the end surface 3e and ridge portion 3g.

As illustrated in FIG. 8, one end of each of the internal electrodes 7 and 9 includes a first region overlapping with the second electrode layer E2 and a second region not overlapping with the second electrode layer E2, when viewed from the third direction D3. The first region is positioned closer to the principal surface 3a in the first direction D1 than the second region. The first electrode layer E1 included in the region $5e_2$ is connected to the first region. The first electrode layer E1 included in the region $5e_1$ is connected to the second region.

In the present embodiment, the second electrode layer E2 continuously covers only the one part of the principal surface 3a, only the one part of the end surface 3e, and only the one part of each of the pair of side surfaces 3c. The second electrode layer E2 covers the entire ridge portion 3g, only the one part of the ridge portion 3i, and only the one part of the ridge portion 3j. The portion of the first electrode layer E1 covering the ridge portion 3i is partially exposed from the second electrode layer E2. For example, the first electrode layer E1 included in the region $5c_1$ is exposed from the second electrode layer E2. The first electrode layer E1 is formed on the end surface 3e to be connected to the first region of the corresponding internal electrode 7 or 9. In the present embodiment, the first electrode layer E1 is formed on the end surface 3e to be also connected to the second region of the corresponding internal electrode 7 or 9.

As illustrated in FIG. 2, a width of the region $5c_2$ in the third direction D3 decreases with an increase in distance from the principal surface 3a. The width of the region $5c_2$ in the third direction D3 decreases with an increase in distance from the electrode portion 5a. A width of the region $5c_2$ in the first direction D1 decreases with an increase in distance from the end surface 3e. The width of the region $5c_2$ in the first direction D1 decreases with an increase in distance from the electrode portion 5e. In the present embodiment, when viewed from the second direction D2, an end edge of the region $5c_2$ has an approximately arc shape. When viewed from the second direction D2, the region $5c_2$ has an approximately fan shape. As illustrated in FIG. 7, in the present embodiment, a width of the second electrode layer E2 when viewed from the second direction D2 decreases with an increase in distance from the principal surface 3a. When viewed from the second direction D2, a length of the second electrode layer E2 in the first direction D1 decreases with an increase in distance in the third direction D3 from the end surface 3e. When viewed from the second direction D2, a length of the portion of the second electrode layer E2 positioned on the side surface 3c in the first direction D1 decreases with an increase in distance in the third direction D3 from an end of the element body 3. As illustrated in FIG. 7, when viewed from the second direction D2, the end edge $E2e$, of the second electrode layer E2 has an approximately arc shape.

As illustrated in FIG. 9, a length L1 of the second electrode layer E2 in the third direction D3 is smaller than a length L2 of the second electrode layer E2 in the first direction D1. The length L1 is, for example, defined as follows. The length L1 is the maximum interval in the third direction D3 between a reference plane $PL_1$ and the end edge $E2e_1$ of the second electrode layer E2 that is included in the electrode portion 5a. The reference plane $PL_1$ abuts with a surface of the second electrode layer E2 that is included in the electrode portion 5e (region $5e_2$), and is parallel with the end surface 3e. The length L1 is, for example, 200 to 1,200 μm. In the present embodiment, the length L1 is 500 μm. The length L1 may be the average value of the interval in the third direction D3 between reference plane $PL_1$ and the end edge $E2e_1$. The length L2 is, for example, defined as follows. The length L2 is the maximum interval in the first direction D1 between a reference plane $PL_2$ and the end edge $E2e_2$ of the second electrode layer E2 that is included in the electrode portion 5e (region $5e_2$). The reference plane $PL_2$ abuts with a surface of the second electrode layer E2 included in the electrode portion 5a, and is parallel with the principal surface 3a. The reference plane $PL_2$ is orthogonal to the reference plane $PL_1$. The length L2 is, for example, 400 to 1,500 μm. In the present embodiment, the length L2 is 800 μm. The length L2 may be the average value of the interval in the first direction D1 between reference plane $PL_2$ and the end edge $E2e_2$.

As illustrated in FIG. 9, the second electrode layer E2 included in the electrode portion 5a has a maximum thickness position E2. The maximum thickness position $E2_{max}$ has a largest thickness in the second electrode layer E2 included in the electrode portion 5a. In the third direction D3, the end edge E1e of the first electrode layer E1 is positioned closer to the end surface 3e than the maximum thickness position $E2_{max}$. The second electrode layer E2 included in the electrode portion 5a includes a first portion positioned on the principal surface 3a, and a second portion positioned on the ridge portion 3g (the first electrode layer E1). In the present embodiment, the maximum thickness position $E2_{max}$ is present in the first portion of the second electrode layer E2. In the first portion, the thickness of the second electrode layer E2 included in the electrode portion 5a is a thickness in the direction orthogonal to the principal surface 3a. In the second portion, the thickness of the second electrode layer E2 included in the electrode portion 5a is a thickness in a normal direction of the ridge portion 3g (curved surface).

The thickness in the first portion of the second electrode layer E2 gradually decreases from the maximum thickness position $E2_{max}$ to the second portion. The thickness in the first portion of the second electrode layer E2 gradually decreases from the maximum thickness position $E2_{max}$ to the end edge $E2e_1$ of the second electrode layer E2. The surface of the second electrode layer E2 curves as the result of changes in the thickness in the second electrode layer E2 of the electrode portion 5a. As illustrated in FIG. 5, the thickness of the first portion of the second electrode layer E2 is larger at the center in the second direction D2 than at the end in the second direction D2, when viewed from the third direction D3. In the present embodiment, the thickness of the first portion of the second electrode layer E2 is largest at the center in the second direction D2, and gradually decreases to the end in the second direction D2.

A thickness of the maximum thickness position $E2_{max}$, that is, a maximum thickness of the second electrode layer E2 included in the electrode portion 5a is equal to or larger than 30 μm. In the present embodiment, the maximum thickness of the second electrode layer E2 included in the electrode portion 5a is 100 μm. The maximum thickness of the second electrode layer E2 included in the electrode portion 5a is larger than a maximum thickness of the second electrode layer E2 included in the electrode portion 5e (region $5e_2$). The thickness of the second electrode layer E2 included in the region $5e_2$ is a thickness in the third direction D3 (direction orthogonal to the end surface 3e). The second electrode layer E2 included in the region $5e_2$ includes a portion positioned on the end surface 3e. The maximum thickness of the second electrode layer E2 included in the electrode region $5e_2$ is equal to or larger than 15 μm. In the present embodiment, the maximum thickness of the second electrode layer E2 included in the electrode region $5e_2$ is 50 μm. The maximum thickness of the second electrode layer E2 included in the electrode portion 5a is larger than a maximum thickness of the second electrode layer E2 included in the electrode portion 5c (region $5c_2$). The thickness of the second electrode layer E2 included in the region $5c_2$ is a thickness in the second direction D2 (direction orthogonal to the side surface 3c). The second electrode layer E2 included in the region $5c_2$ includes a portion positioned on the side surface 3c. The maximum thickness of the second electrode layer E2 included in the region $5c_2$ is equal to or larger than 5 μm. In the present embodiment, the maximum thickness of the second electrode layer E2 included in the region $5c_2$ is 15 μm.

As illustrated in FIG. 9, a length L3 from the maximum thickness position $E2_{max}$ to the end edge $E2e_1$ of the second electrode layer E2, in the third direction D3 is larger than a length L4 from the maximum thickness position $E2_{max}$ to the end edge E1e of the first electrode layer E1, in the third direction D3. The length L3 is, for example, 75 to 500 μm. In the present embodiment, the length L3 is 200 μm. The length L4 is, for example, 25 to 300 μm. In the present embodiment, the length L4 is 100 μm.

In the multilayer capacitor C1, the length L2 of the second electrode layer E2 in the first direction D1 is larger than a length L5 from the end edge E1e of the first electrode layer E1 to the end edge $E2e_1$ of the second electrode layer E2, in the third direction D3. The length L5 is the sum of the length L3 and the length L4. Therefore, in the present embodiment, the length L5 is 300 μm.

An area of the second electrode layer E2 included in the electrode portion 5e (region $5e_2$) is larger than an area of the first portion included in the second electrode layer E2. As described above, the second electrode layer E2 that is included in the electrode portion 5e (region $5e_2$) is the portion positioned on the end surface 3e, in the second electrode layer E2. The first portion included in the second electrode layer E2 is a portion positioned on the principal surface 3a, in the second electrode layer E2 included in the electrode portion 5a. The area of the second electrode layer E2 included in the electrode portion 5e (region $5e_2$) is 500000 to 3750000 μm². In the present embodiment, the area of the second electrode layer E2 included in the electrode portion 5e (region $5e_2$) is 2000000 μm². The area of the first portion included in the second electrode layer E2 is 250000 to 3000000 μm². In the present embodiment, the area of the first portion included in the second electrode layer E2 is 1250000 μm².

In a case in which the multilayer capacitor C1 is solder-mounted on the electronic device, external force applied onto the multilayer capacitor C1 from the electronic device may act as stress on the element body 3. In this case, a crack may occur in the element body 3. The external force acts on the element body 3 from a solder fillet formed at the solder-mounting, through the external electrode 5. The external force tends to act on a region defined by the one part of the principal surface 3a, the one part of the end surface 3e, and the one part of the pair of side surfaces 3c, in the element body 3. In the multilayer capacitor C1, the second electrode layer E2 (second electrode layer E2 included in the electrode portions 5a, 5c, and 5e) continuously covers the one part of the principal surface 3a, the one part of the end surface 3e, and the one part of each of the pair of side surfaces 3c. Therefore, the external force applied onto the multilayer capacitor C1 from the electronic device tends not to act on the element body 3. Consequently, the multilayer capacitor C1 suppresses occurrence of a crack in the element body 3.

A region between the element body 3 and the second electrode layer E2 may include a path through which moisture infiltrates. In a case in which moisture infiltrates from the region between the element body 3 and the second electrode layer E2, durability of the multilayer capacitor C1 decreases. The multilayer capacitor C1 includes few paths through which moisture infiltrates, as compared with an electronic component in which the second electrode layer E2 covers the entire end surface 3e, one part of each of the principal surfaces 3a and 3b, and one part of each of the pair of side surfaces 3c. Therefore, the multilayer capacitor C1 improves moisture resistance reliability. In the multilayer capacitor C1, the length L1 of the second electrode layer E2 in the third direction D3 is smaller than the length L2 of the second electrode layer E2 in the first direction D1. Therefore, the multilayer capacitor C1 includes further few paths through which moisture infiltrates, as compared with an electronic component in which the length L1 is equal to or larger than the length L2. Therefore, the multilayer capacitor C1 further improves the moisture resistance reliability.

The length L3, in the third direction D3, from the maximum thickness position $E2_{max}$ to the end edge $E2e_1$ of the second electrode layer E2 is larger than the length L4, in the third direction D3, from the maximum thickness position $E2_{max}$ to the end edge E1e of the first electrode layer E1. The stress acting on the element body 3 tends to concentrate on the end edge E1e of the first electrode layer E1. In a configuration in which the length L3 is larger than the length L4, volume of the portion positioned on the principal surface 3a in the second electrode layer E2 is large, as compared with an electronic component in which the length L3 is equal to or smaller than the length L4. Therefore, the multilayer capacitor C1 reduces the stress concentrating on the end edge E1e of the first electrode layer E1. Consequently, the multilayer capacitor C1 further suppresses the occurrence of a crack in the element body 3.

In a case in which the external force acts on the end edge $E2e_1$ of the second electrode layer E2, the second electrode layer E2 may peel off from the element body 3 (principal surface 3a) with the end edge $E2e_1$ as a starting point. In the multilayer capacitor C1, the thickness of the second electrode layer E2 included in the electrode portion 5a gradually decreases from the maximum thickness position $E2_{max}$ to the end edge $E2e_1$ of the second electrode layer E2. Therefore, in the multilayer capacitor C1, the external force tends not to act on the end edge $E2e_1$ of the second electrode layer E2, as compared with an electronic component in which a thickness of the second electrode layer E2 is constant. Consequently, in the multilayer capacitor C1, the second electrode layer E2 tends not to peel off from the element body 3 (principal surface 3a).

In the multilayer capacitor C1, the length L2 of the second electrode layer E2 in the first direction D1 is larger than the length L5, in the third direction D3, from the end edge E1e of the first electrode layer E1 to the end edge $E2e_1$ of the second electrode layer E2. The multilayer capacitor C1 suppresses that external force applied onto the electrode portion 5e acts as stress on the element body 3, as compared with an electronic component in which the length L2 is equal to or smaller than the length L5. Therefore, the multilayer capacitor C1 further suppresses the occurrence of a crack in the element body 3.

In the multilayer capacitor C1, the area of the second electrode layer E2 included in the electrode portion 5e (region $5e_2$) is larger than the area of the first portion included in the second electrode layer E2. The multilayer capacitor C1 suppresses that external force applied onto the electrode portion 5e acts as stress on the element body 3, as compared with an electronic component in which the area of the second electrode layer E2 included in the region $5e_2$ is equal to or smaller than the area of the first portion included in the second electrode layer E2. Therefore, the multilayer capacitor C1 further suppresses the occurrence of a crack in the element body 3.

In the multilayer capacitor C1, the maximum thickness of the second electrode layer E2 included in the electrode portion 5a is larger than the maximum thickness of the second electrode layer E2 included in the region $5e_2$. The multilayer capacitor C1 reduces the stress concentrating on the end edge E1e of the first electrode layer E1, as compared with an electronic component in which the maximum thickness of the second electrode layer E2 included in the electrode portion 5a is equal to or smaller than the maximum thickness of the second electrode layer E2 included in the region $5e_2$. Therefore, the multilayer capacitor C1 further suppresses the occurrence of a crack in the element body 3.

Figure 10:
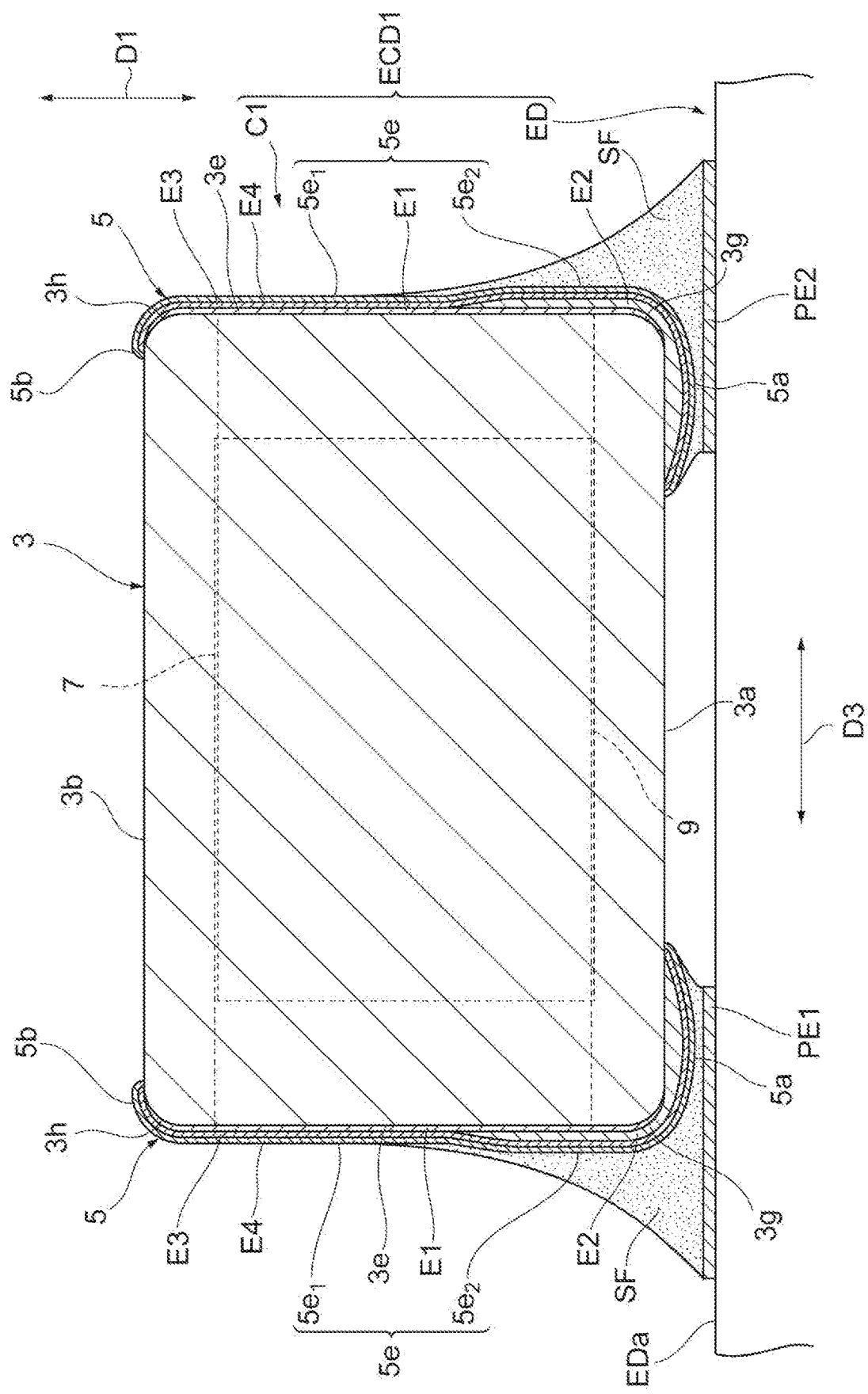
FIG. 10 is a view illustrating a mounting structure of the multilayer capacitor according to the embodiment.

Next, a mounted structure of the multilayer capacitor C1 will be described with reference to FIG. 10. FIG. 10 is a view illustrating a mounted structure of a multilayer capacitor according to the embodiment.

As illustrated in FIG. 10, an electronic component device ECD1 includes the multilayer capacitor C1 and an electronic device ED. The electronic device ED includes, for example, a circuit board or an electronic component. The multilayer capacitor C1 is solder-mounted on the electronic device ED. The electronic device ED includes a principal surface EDa and a plurality of pad electrodes PE1 and PE2. In the present embodiment, the electronic device ED includes two pad electrodes PE1 and PE2. Each of the pad electrodes PE1 and PE2 is disposed on the principal surface EDa. The two pad electrodes PE1 and PE2 are separated from each other. The multilayer capacitor C1 is disposed on the electronic device ED in such a manner that the principal surface 3a and the principal surface EDa oppose each other. As described above, the principal surface 3a is arranged to constitute a mounting surface.

When the multilayer capacitor C1 is solder-mounted, molten solder wets to the external electrodes 5 (fourth electrode layer E4). Solder fillets SF are formed on the external electrodes 5 by solidification of the wet solder. The external electrodes 5 and the pad electrodes PE1 and PE2 corresponding to each other are coupled via the solder fillets SF.

The solder fillet SF is formed on the regions $5e_1$ and $5e_2$ included in the electrode portion 5e. In addition to the region $5e_2$, the region $5e_1$ that does not include the second electrode layer E2 is also coupled to the corresponding pad electrode PE1 or PE2 via the solder fillet SF. When viewed from the third direction D3, the solder fillet SF overlaps the region $5e_1$ included in the electrode portion 5e. When viewed from the third direction D3, the solder fillet SF overlaps the first electrode layer E1 included in the region $5e_1$. Although illustration is omitted, the solder fillets SF are also formed on the regions $5c_1$ and $5c_2$ included in the electrode portion 5c. A height of the solder fillet SF in the first direction D1 is larger than a height of the second electrode layer E2 in the first direction D1. The solder fillet SF extends in the first direction D1 to be closer to the principal surface 3b than the end edge E2$e_2$ of the second electrode layer E2.

As described above, the electronic component device ECD1 suppresses occurrence of a crack in the element body 3, and improves moisture resistance reliability. In the electronic component device ECD1, when viewed from the third direction D3, the solder fillet SF overlaps the region 5$e_1$ included in the electrode portion 5e. Therefore, even in a case in which the external electrode 5 includes the second electrode layer E2, the electronic component device ECD1 suppresses an increase in equivalent series resistance (ESR).

Although the embodiments and modifications of the present invention have been described above, the present invention is not necessarily limited to the embodiments and modifications, and the embodiment can be variously changed without departing from the scope of the invention.

The first electrode layer E1 may be formed on the principal surface 3a to extend over the ridge portion 3g entirely or partially from the end surface 3e. The first electrode layer E1 may be formed on the principal surface 3b to extend beyond the ridge portion 3h entirely or partially from the end surface 3e. In a case in which the first electrode layer E1 is formed on the principal surface 3b, an electrode portion disposed on the principal surface 3b may be four-layered. The first electrode layer E1 may be formed on the side surface 3c to extend beyond the ridge portion 3i entirely or partially from the end surface 3e. In a case in which the first electrode layer E1 is formed on the side surface 3c, an electrode portion disposed on the side surface 3c may be four-layered.

The number of internal electrodes 7 and 9 included in the multilayer capacitor C1 is not limited to the number of the internal electrodes 7 and 9 illustrated. In the multilayer capacitor C1, the number of the internal electrodes connected to one external electrode 5 (first electrode layer E1) may be one.

The electronic component of the present embodiment is the multilayer capacitor C1. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component, comprising:
    an element body of a rectangular parallelepiped shape including a first principal surface arranged to constitute a mounting surface, a second principal surface opposing the first principal surface in a first direction, a pair of side surfaces opposing each other in a second direction, and a pair of end surfaces opposing each other in a third direction; and
    two external electrodes respectively disposed at both end portions of the element body in the third direction, one of the external electrodes including:
        a conductive resin layer continuously covering one part of the first principal surface, one part of the end surface, and one part of each of the pair of side surfaces; and
        a sintered metal layer disposed on the end portion of the element body to be positioned between the element body and the conductive resin layer, the sintered metal layer including an exposed region exposed from the conductive resin layer and a covered region covered with the conductive resin layer, the covered region being closer to the first principal surface than is the exposed region,
    wherein for the one external electrode:
        the conductive resin layer is disposed on the sintered metal layer and on the one part of the first principal surface, and includes a portion positioned on the first principal surface,
        the portion positioned on the first principal surface includes a maximum thickness position,
        a first length of the conductive resin layer in the third direction is smaller than a second length of the conductive resin layer in the first direction,
        a third length from the maximum thickness position to an end edge of the conductive resin layer, in the third direction is larger than a fourth length from the maximum thickness position to an end edge of the sintered metal layer, in the third direction, and
        the end edge of the sintered metal layer on the first principal surface is positioned closer to the end surface than the maximum thickness position, in the third direction.

2. The electronic component according to claim 1, wherein a thickness of the portion positioned on the first principal surface gradually decreases from the maximum thickness position to the end edge of the conductive resin layer.

3. The electronic component according to claim 1, wherein the second length of the conductive resin layer in the first direction is larger than a fifth length from the end edge of the sintered metal layer to the end edge of the conductive resin layer, in the third direction.

4. The electronic component according to claim 1, wherein
    the conductive resin layer includes a portion positioned on the first principal surface and a portion positioned on the end surface, and
    an area of the portion positioned on the end surface is larger than an area of the portion positioned on the first principal surface.

5. The electronic component according to claim 1, wherein
    the conductive resin layer includes a portion positioned on the first principal surface and a portion positioned on the end surface, and
    the maximum thickness position has a larger thickness than a maximum thickness of the portion positioned on the end surface.

6. An electronic component, comprising:
    an element body of a rectangular parallelepiped shape including a first principal surface arranged to constitute a mounting surface, a second principal surface opposing the first principal surface in a first direction, a pair of side surfaces opposing each other in a second direction, and a pair of end surfaces opposing each other in a third direction; and
    an external electrode that is disposed on the element body and includes:
        a conductive resin layer; and
        a sintered metal layer disposed on an end portion of the element body in the third direction, the sintered metal layer including an exposed region exposed from the conductive resin layer and a covered region covered with the conductive resin layer, the covered region being closer to the first principal surface than is the exposed region, wherein the conductive resin layer continuously covers one part of the first principal surface, one part of the end surface, and one part of each of the pair of side surfaces to be disposed on the sintered metal layer and on the one part of the first principal surface, and includes a portion positioned on the first principal surface, the portion positioned on the first principal surface includes a maximum thickness position, a length of the conductive resin layer in the third direction is smaller than a length of the conductive resin layer in the first direction, a length from the maximum thickness position to an end edge of the conductive resin layer, in the third direction is larger than a length from the maximum thickness position to an end edge of the sintered metal layer, in the third direction, and the end edge of the sintered metal layer on the first principal surface is positioned closer to the end surface than the maximum thickness position, in the third direction.

7. An electronic component, comprising:

an element body of a rectangular parallelepiped shape including a first principal surface arranged to constitute a mounting surface, a second principal surface opposing the first principal surface in a first direction, a pair of side surfaces opposing each other in a second direction, and a pair of end surfaces opposing each other in a third direction; and two external electrodes respectively disposed at both end portions of the element body in the third direction, one of the external electrodes including:

a conductive resin layer continuously covering one part of the first principal surface, one part of the end surface, and one part of each of the pair of side surfaces; and a sintered metal layer disposed on the end portion of the element body to be positioned between the element body and the conductive resin layer, the sintered metal layer including an exposed region exposed from the conductive resin layer and a covered region covered with the conductive resin layer, the covered region being closer to the first principal surface than is the exposed region, wherein for the one external electrode:

the conductive resin layer is disposed on the sintered metal layer and on the one part of the first principal surface, and includes a portion positioned on the first principal surface, the portion positioned on the first principal surface includes a maximum thickness position, a first length of the conductive resin layer in the third direction is smaller than a second length of the conductive resin layer in the first direction, a third length from the maximum thickness position to an end edge of the conductive resin layer, in the third direction is larger than a fourth length from the maximum thickness position to an end edge of the sintered metal layer, in the third direction, and the fourth length is larger than zero.

8. An electronic component, comprising:

an element body of a rectangular parallelepiped shape including a first principal surface arranged to constitute a mounting surface, a second principal surface opposing the first principal surface in a first direction, a pair of side surfaces opposing each other in a second direction, and a pair of end surfaces opposing each other in a third direction; and two external electrodes respectively disposed at both end portions of the element body in the third direction, one of the external electrodes including:

a conductive resin layer continuously covering one part of the first principal surface, one part of the end surface, and one part of each of the pair of side surfaces; and a sintered metal layer disposed on the end portion of the element body to be positioned between the element body and the conductive resin layer, the sintered metal layer including an exposed region exposed from the conductive resin layer and a covered region covered with the conductive resin layer, the covered region being closer to the first principal surface than is the exposed region, wherein for the one external electrode:

the conductive resin layer is disposed on the sintered metal layer and on the one part of the first principal surface, and includes a portion positioned on the first principal surface, the portion positioned on the first principal surface includes a maximum thickness position, a first length of the conductive resin layer in the third direction is smaller than a second length of the conductive resin layer in the first direction, a third length from the maximum thickness portion to an end edge of the conductive resin layer, in the third direction is larger than a fourth length from the maximum thickness position to an edge of the sintered metal layer, in the third direction, and the end edge of the sintered metal layer on the first principal surface and the maximum thickness position are separated from each other in the third direction.

* * * * *